United States Patent [19]
Forster

[11] Patent Number: 4,680,166
[45] Date of Patent: * Jul. 14, 1987

[54] ARRANGEMENT FOR CENTERING AND MANIPULATING CONDUITS IN A LARGE-AREA CELL FOR REPROCESSING IRRADIATED NUCLEAR FUEL

[75] Inventor: Jürgen Forster, Minden, Fed. Rep. of Germany

[73] Assignee: Deutsche Gesellschaft für Wiederaufarbeitung von Kernbrennstoffen mbH, Hanover, Fed. Rep. of Germany

[ * ] Notice: The portion of the term of this patent subsequent to Feb. 3, 2004 has been disclaimed.

[21] Appl. No.: 769,585

[22] Filed: Aug. 26, 1985

[30] Foreign Application Priority Data

Aug. 25, 1984 [DE] Fed. Rep. of Germany ....... 3431325

[51] Int. Cl.⁴ ............................................. G21C 19/44
[52] U.S. Cl. .................................... 422/159; 422/903; 252/627; 285/24; 285/27
[58] Field of Search .................. 422/159, 903; 285/24, 285/27, 363, 405; 252/626, 627, 628, 631

[56] References Cited

U.S. PATENT DOCUMENTS

| | | | |
|---|---|---|---|
| 1,311,023 | 7/1919 | Stone | 285/27 |
| 1,660,733 | 2/1928 | Tomlinson | 213/109 |
| 2,517,391 | 8/1950 | Ernestus | 285/27 |
| 4,280,922 | 7/1981 | Puthawala et al. | 252/628 |

FOREIGN PATENT DOCUMENTS 64004 11/1982 European Pat. Off. .............. 285/24
2149869 6/1985 United Kingdom ................ 422/159

Primary Examiner—David L. Lacey
Attorney, Agent, or Firm—Walter Ottesen

[57] ABSTRACT

An arrangement for centering and manipulating conduits is disclosed. The arrangement is an aid for connecting flanges together by remote control and can be used to connect the end flange of a stationary conduit to an end flange of a removable conduit portion. The use of the centering and manipulating arrangement is in a process cell such as a large-area cell for reprocessing irradiated nuclear fuels. The interface plane of the two end flanges to be connected together is disposed perpendicularly. In order to permit rapid and secure coupling, with a low level of technical complexity, the end flange of the stationary conduit is provided with an upwardly open guide cradle at its peripheral edge. The guide cradle is arranged in parallel relationship to the rotational axis of the end flange and is mounted laterally thereon. In the rearward region which is towards the stationary conduit, the guide cradle includes a catch ring. A guide pin which fits into the guide cradle is secured laterally to the periphery of the associated end flange of the removable conduit portion. In the connected condition of the flange pairs, the guide pin lies in the guide cradle and projects through the catch ring.

4 Claims, 4 Drawing Figures

ARRANGEMENT FOR CENTERING AND MANIPULATING CONDUITS IN A LARGE-AREA CELL FOR REPROCESSING IRRADIATED NUCLEAR FUEL

BACKGROUND OF THE INVENTION

Installations for reprocessing irradiated nuclear fuels have what are referred to as hot large-area cells for accommodating the process engineering components. In such radiation-shielded cells, the process components are set up in frame structures or support assemblies commonly referred to as racks.

Maintenance operations within the large-area cell which is charged with radioactive radiation are carried out by means of movable remote manipulating machines. The process components which are arranged in the racks are connected together with conduits and are connected to conduits which lead through the cell wall. When the process components are replaced, the conduits must be separated by remote control and re-connected together after a new process component has been installed. Generally, in order to permit such operation of replacing a process component or also dismantling of a rack, it is necessary for entire portions of the conduits to be removed because they would impede replacement of the process component or removal of the rack or of a rack module.

Therefore, use is made of removable conduit parts referred to as conduit connecting units, which at their ends are connected with couplable end flanges. Those end flanges are the flanges which, when joining stationary conduits which pass through the cell wall, are coupled to the end flanges thereof, or are coupled to the end flanges of a conduit connection of a process component which is disposed in the rack. Therefore, a conduit connecting unit is mounted under remote control between the two end flanges of two stationary conduit connections, and is replaceable or removable. The pairs of flanges each including two end flanges are connected by known means such as threaded fasteners or clamping ring coupling assemblies.

When fitting a conduit connecting unit, the end flanges which are to be coupled must be brought together in a centered relationship. Centering aids of that kind are known and are suitable for ensuring that, when the flanges of a pair of flanges are brought together and fastened in the assembled condition, under remote control, the positions of the respective corresponding bores of the end flanges which are to be connected together are in aligned relationship.

As this operation of bringing the pairs of flanges together must be carried out by a remotely-controlled manipulation procedure, a particular problem is presented for the operator who monitors and performs the connecting operation by means of television pictures. It is found that it is difficult to see into the coupling location shortly before the end flanges come together. That results in frequent failures in attempting to install the removable or replaceable conduit connecting unit.

Usually, the end flanges of the conduit connecting unit have threaded fasteners which are held therein so that they cannot be lost and which must be screwed into the end flange of the stationary conduit after the arrays of bores in the two end flanges to be joined have been brought into alignment. It is therefore necessary to maintain the position of the threaded bores in the end flange relative to the through bores (or the threaded fasteners disposed therein) in the end flange of the conduit connecting unit until the oppositely disposed flanges are correctly fastened together by the threaded fasteners, the end flange of the conduit connecting unit being fitted into position by remote control.

It is known for pairs of flanges in nuclear processing installations to be fitted with what are referred to as pilot or registration pins. More specifically, a centering pin is screwed into the shoulder portion of the end flange on the conduit connecting unit, while the tip of the centering pin, which projects out of the above-mentioned end flange, projects into a corresponding centering bore in the other end flange when the two end flanges are brought together. When working with conduit connecting units of unfavorable geometry, for example, a conduit assembly having a configuration with complicated bends, the use of that centering pin gives little advantage and very easily results in faults or damage to the seals of the flanges.

Published German Patent Application DE-OS 33 41 044 which corresponds to copending U.S. patent application Ser. No. 663,444, filed Oct. 22, 1984, discloses a centering device for the remote-controlled coupling of an end flange of a stationary conduit to an end flange of a conduit connecting unit. This centering device is configured so that a vertical centering pin is arranged to project upwardly on the stationary conduit; whereas, a receiving portion having centering surfaces and which fits onto the centering pin is mounted on the removable conduit connecting unit. With this device, an optical aid is provided for bringing together the flanges which are to be coupled to each other.

SUMMARY OF THE INVENTION

It is an object of the invention to provide a centering and manipulating arrangement for facilitating the coupling operation so that the latter can be carried out quickly and reliably.

The centering and manipulating arrangement of the invention includes two parts, of which one part is attached to the end flange of the stationary conduit and another part is mounted on the end flange of the conduit connecting unit. The guide pin which projects beyond the interface plane conjointly defined by the two mutually adjacent end flanges is secured laterally to the end flange of the conduit connecting unit and, in the assembled condition, is disposed in a guide cradle with a catch ring that is arranged at the rearward end of the guide cradle. The operator can easily inspect the centering and manipulating arrangement under conditions of television viewing and can bring the flange connections together quickly and without difficulty.

When removing a conduit connection unit or a conduit portion which is equipped in accordance with the invention, under remote control, all threaded fasteners can be threadably disengaged from the end flanges before a lifting device has to be fitted to a conduit connection unit or to the conduit portion which is to be replaced. The configuration in accordance with the invention minimizes the danger of the conduit connection or the replacement component being dropped because the guide pins secure the conduit connection unit or the replacement component in the catch rings of the guide cradles. Therefore, the screwing operation and then the replacement operation, or vice-versa, can be carried out with only one lifting device.

The operator who is operating by remote control and who watches the coupling procedure by way of television monitors, when installing a conduit connecting unit, positions the conduit connecting unit which is hanging from a lifting device in a position such that the guide pin at the outside diameter of the end flange is fitted into the guide cradle. After a suitable advance movement with the lifting device which is holding the conduit connecting unit, in a direction towards the end flange on the stationary conduit, the guide pin is moved into the catch ring which is disposed at the end of the guide cradle.

By virtue of the guide pins of the two end flanges of the conduit connecting unit being moved into the catch rings, the conduit connecting unit is held so securely that it cannot drop while the threaded fasteners are being tightened. The same lifting device can now be used for bringing up the impact wrench which serves for screwing the threaded fasteners into position.

The centering and manipulating arrangement according to the invention thus affords the operator who is viewing the procedure by way of picture screens and who is carrying out the operation by remote control, the possibility of operating in a manner which is still satisfactory even under poor viewing conditions.

The notches on the surface of the guide pins prevent the replaceable conduit portion or the replaceable piece of equipment from dropping out when in the condition of having been threadably disengaged but not yet withdrawn.

The arrangement according to the invention makes it possible to eliminate the registry pins in the shoulder portions of the flanges.

BRIEF DESCRIPTION OF THE DRAWING

The invention will now be described with reference to the drawing wherein.

Figure 1:
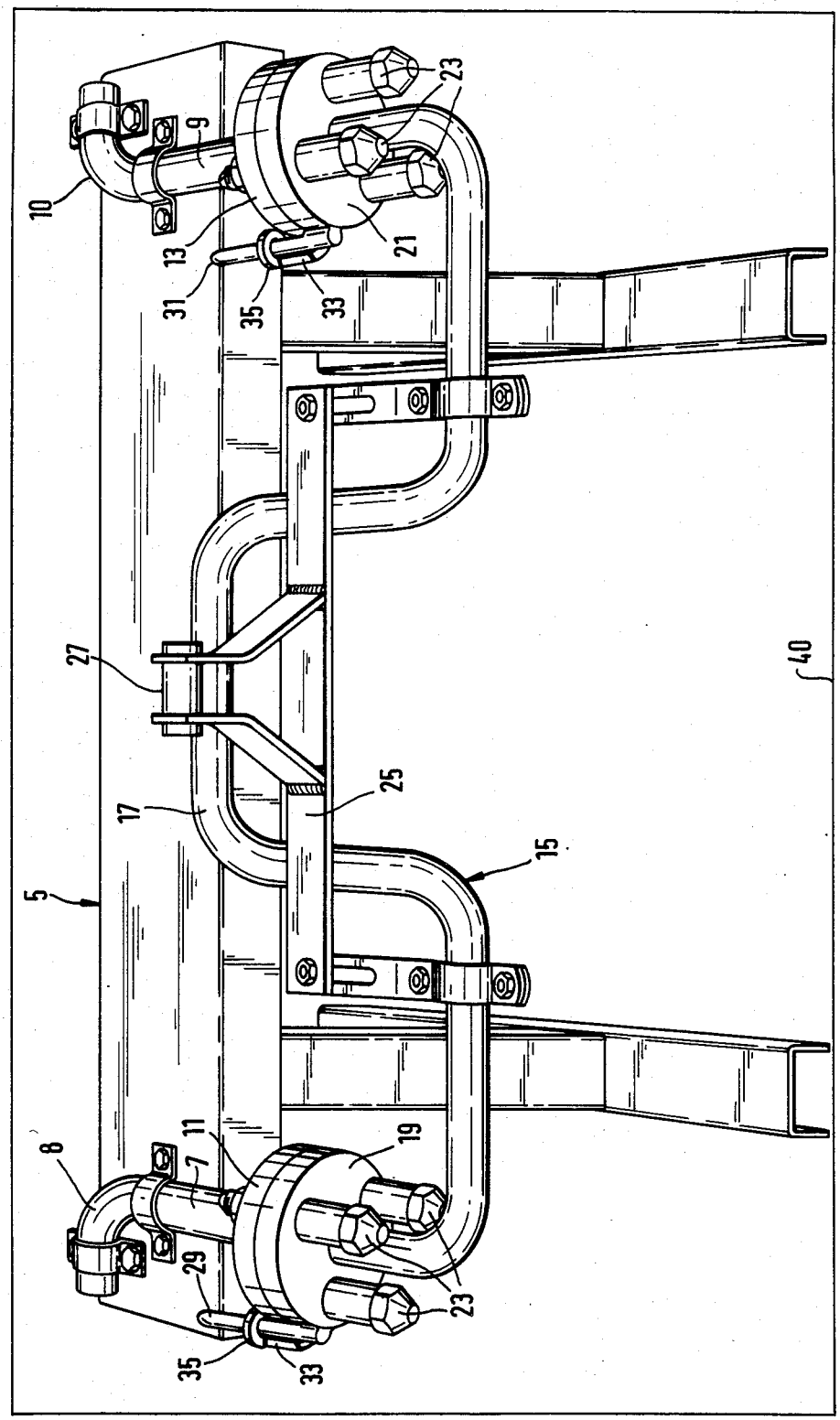
FIG. 1 shows a conduit connecting unit which is mounted horizontally on two end flanges, at the rack side, on two stationary conduits, respectively inside of a large-area cell.

In the drawings, details and devices which are not required for the purposes of understanding the invention are omitted for the sake of improved clarity.

DESCRIPTION OF THE PREFERRED EMBODIMENTS OF THE INVENTION

Referring to FIG. 1, two conduit ends 7 and 9 of respective conduit lengths 8 and 10 are bent through 90° and terminate in end flanges 11 and 13, respectively, welded thereto. The conduit ends 7 and 9 extend from a rack or frame structure 5 mounted in a large-area cell 40 for reprocessing irradiated nuclear fuel. The frame structure 5 accommodates process components (not shown herein) for the chemical reprocessing of nuclear fuels. The two end flanges 11 and 13 are disposed in a common horizontal plane and are connected together by a conduit connecting unit 15 having a conduit portion 17 thereby forming a continuous conduit made up of conduit portion 17 and conduit lengths 8 and 10. which carries the medium to be processed.

The conduit connecting unit 15 is of a bent configuration for the purposes of giving a better position for the center of gravity thereof and which has end flanges 19 and 21 which are welded thereon at the respective ends thereof. The two end flanges 19 and 21 are each connected to a respective end flanges 11 and 13 of the conduits ends 7 and 9 on the rack side, by threaded bolts 23.

A bracket 25 is attached to the conduit connecting unit 15 in an aligned position relative to the center of gravity. At its center the bracket 25 has a carrying eye or lug 27 which is welded thereto and which can be engaged by a load hook of a lifting device.

At their sides, the end flanges 19 and 21 have respective guide pins 29 and 31 welded thereto. The guide pins 29 and 31 are parallel to the respective axes of the throughflow bores of the end flanges 19 and 21. Each guide pin 29 and 31 lies in respective guide cradles 33 which are suitably mounted laterally on the respective end flanges 11 and 13. At the rearward end, towards the rack 5, the guide cradles 33 terminate in respective catch rings 35. Each guide pin 29 and 31 lies in the corresponding guide cradle 33 and also projects through the corresponding catch ring 35 and beyond the same.

Figure 2:
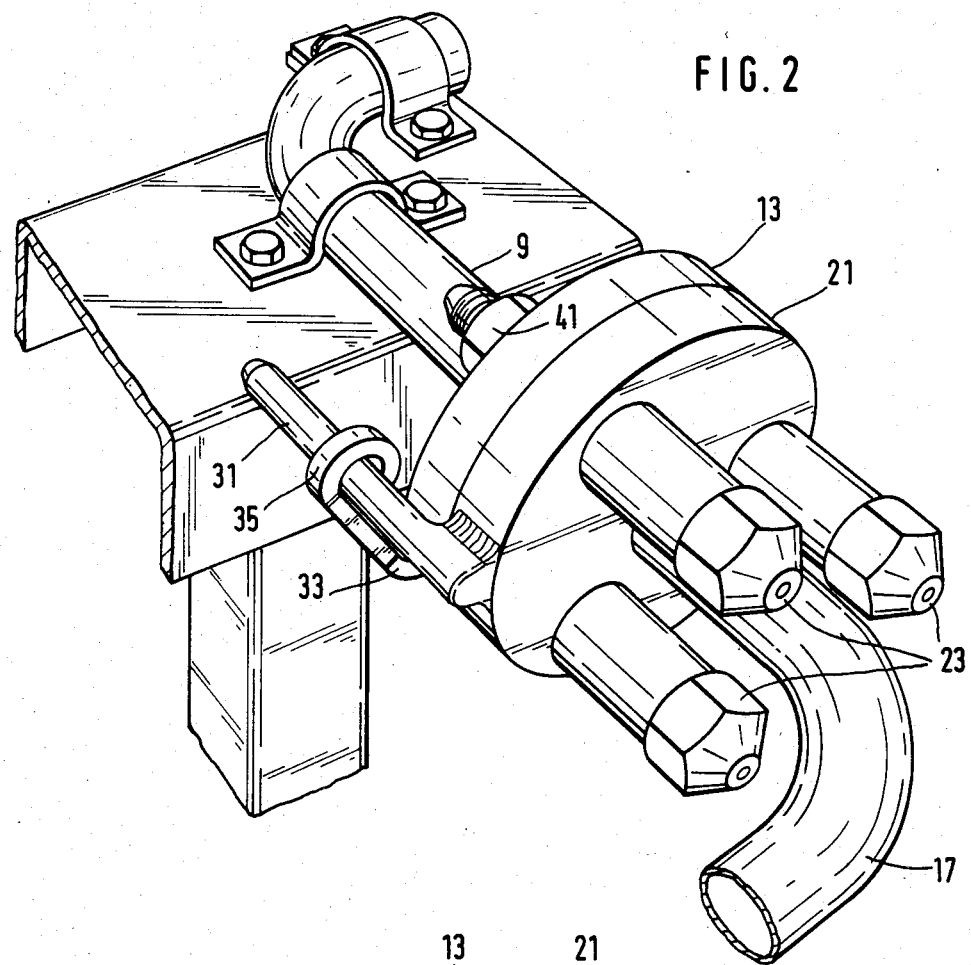
FIG. 2 is a perspective view, on an enlarged scale, of a pair of flanges, as viewed from the conduit connecting unit.
Figure 3:
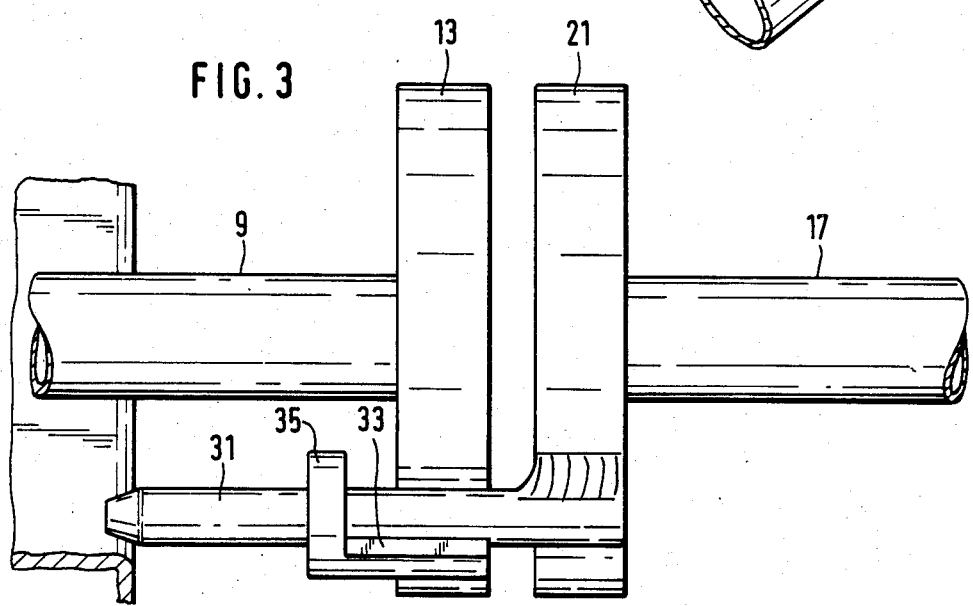
FIG. 3 is a side view of a flange connection in a position in which it has been threadably disconnected and pulled apart somewhat, without showing the necked-down bolts which usually remain in the end flange on the conduit connecting unit; and, FIG. 4 shows a modified embodiment of a conduit connecting unit with centering and manipulating aids.

FIG. 2 shows that the pair of flanges 13 and 21 couples a conduit end 9 and conduit portion 17 which extend from the center point of the pair of flanges 13 and 21. Arranged around the conduit portion 17 are three threaded bolts 23 which have their actuating hexagon away from the end flange side of the conduit connecting unit. Provided in the end flange 21 are through bores while the corresponding threaded bores are provided in the end flange 13. The threaded bolts 23 are secured on the back of the end flange 13 by means of suitable nuts 41. FIG. 3 shows the guide pin 31 with the threaded bolts 23 removed.

Figure 4:
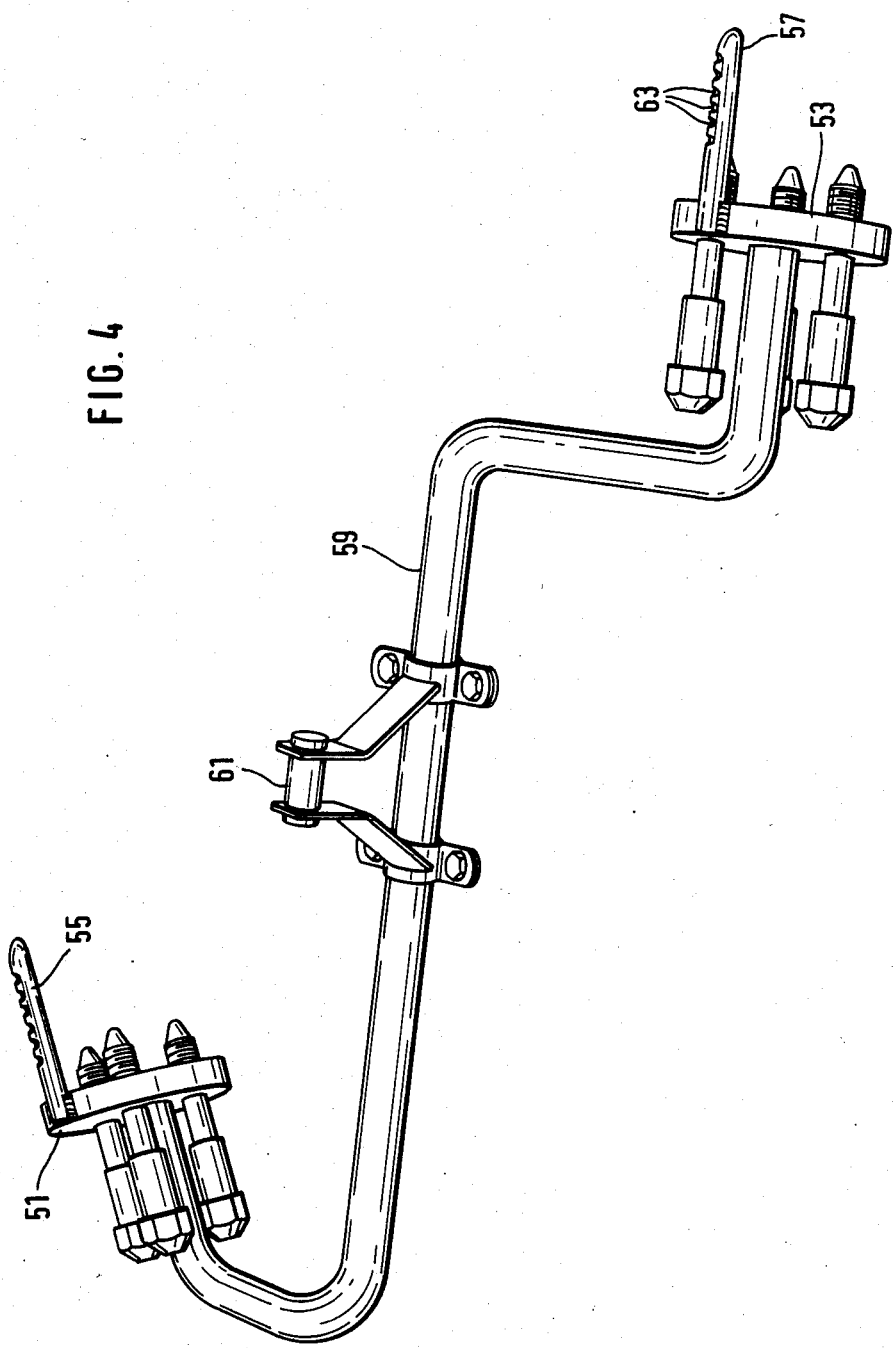

The modified embodiment shown in FIG. 4 is used for connecting conduit connections which are not arranged in parallel-axial relationship to each other. By means of the centering and manipulating arrangement of which FIG. 4 only shows the parts provided on the respective end flanges 51 and 53 of the conduit connecting unit 59, namely the guide pins 55 and 57 respectively, it is possible for such conduit connections which are inclined relative to each other to be connected together.

This conduit connecting unit 59 also carries, at its center of gravity, a carrying lug 61 which can be engaged by a load hook. The guide pins 55 and 57 respectively are provided on their surface with barb-like notches 63 which, when the flange pairs are in the condition of being threadably disengaged from each other, effectively prevent the conduit connecting unit 59 from falling out because the notches 63 hook onto the upper edge of the respective catch ring at the end of the guide cradle.

Dismantling of the conduit connecting unit 15 (FIGS. 1 to 3) takes place in the fashion described below.

Using a lifting device, the operator brings a remotely controllable impact wrench to the end flange side of the conduit connecting unit 15 of one of the two pairs of flanges (11, 19). The three threaded bolts 23 are threadably disengaged and entirely removed from the threaded bores in the end flange 11, The pins or bolts 23 remain secured in position in the through bores in the end flange 19. The operator then moves the impact wrench to the other pair of flanges (13, 21) and there repeats the above-described operation.

Although the threaded fastener connections between the conduit connecting unit 15 and the fixed flanges 11 and 13 are now disengaged, the conduit connecting unit is secured against dropping down by virtue of the guide pins 29 and 31 which are still in the inserted condition. The operator moves the impact wrench to a storage position by means of the lifting device and now uses the same lifting device for engaging the conduit connecting unit 15 at its carrier lug 27. The guide pins 29 and 31 come out of the catch rings by movement away from the fixed flanges 11 and 13 and the conduit connecting unit 15 can now be removed.

A new conduit connecting unit 15 is brought up to the point of connection by picking it up at its carrying lug 27 by means of a lifting device which has a load hook. The operator places the conduit connecting unit 15 with the guide pins 29 and 31 substantially centrally on the periphery of the end flanges 11 and 13 and, by lowering the conduit connecting unit 15, permits the guide pins 29 and 31 to slide down on the outside periphery of the flanges so that the guide pins positively engage into the guide cradles. After that, a forward movement is performed in the direction towards the end flanges 11 and 13 by means of the lifting device, so that the guide pins 29 and 31 pass into the respective catch rings 35 and are secured therein. The crane hook of the lifting device is removed from the lug 27 and the lifting device is used to pick up an impact wrench and move it to the end flange side of the conduit connecting unit 15 of a pair of flanges (11, 19). The threaded fasteners 23 are screwed into the end flange 11 and then the same operation is carried out on the other pair of flanges (13, 21). The conduit connecting unit 15 has been quickly and safely replaced.

It is understood that the foregoing descripton is that of the preferred embodiments of the invention and that various changes and modifications may be made thereto without departing from the spirit and scope of the invention as defined in the appended claims.

What is claimed is:

1. In a large-area cell containing equipment for reprocessing irradiated nuclear fuels, the equipment having a stationary conduit with an end flange connectable to a removable conduit unit also having an end flange, said end flanges having respective rotational axes and conjointly defining an interface when disposed one next to the other, the large-area cell being equipped with remote handling apparatus for moving the removable flanged conduit unit relative to the stationary conduit, a centering and manipulating arrangement for facilitating the remotely manipulated connection of the end flange of the removable flanged conduit unit to the end flange of the stationary conduit, the arrangement comprising:

an upwardly open guide cradle attached to the peripheral edge of one of said end flanges, said cradle being mounted laterally on said one end flange and parallel to the rotational axis of said one end flange;

said guide cradle including a catch ring disposed thereon at a predetermined location rearward of the interface of the end flanges; and, a guide pin fixedly mounted on the other one of said end flanges so as to be received in said guide cradle so as to extend through said catch ring when said end flanges are connected to each other.

2. The large-area cell of claim 1, wherein said guide cradle is attached to the peripheral edge of said end flange of said stationary conduit and said guide pin is fixedly mounted on said end flange of said removable flanged conduit unit.

3. The large-area cell of claim 1, further comprising barb means formed on said guide pin for holding said removable flanged conduit unit in position on said stationary unit after the connection holding said end flanges together has been disengaged.

4. The large-area cell of claim 1, wherein said removable flanged conduit has a lug for receiving a load hook therein whereby said removable flanged conduit can be lifted and moved in said large-area cell.

* * * * *